(12) United States Patent
Deppe et al.

(10) Patent No.: US 8,067,903 B2
(45) Date of Patent: Nov. 29, 2011

(54) METHOD AND DRIVING UNIT FOR DRIVING A GAS DISCHARGE LAMP

(75) Inventors: Carsten Deppe, Aachen (DE); Hendrik Anton Van Esveld, Geldrop (NL); Tobias Georg Tolle, Beerse (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 598 days.

(21) Appl. No.: 12/279,855

(22) PCT Filed: Feb. 9, 2007

(86) PCT No.: PCT/IB2007/050427
§ 371 (c)(1),
(2), (4) Date: Aug. 19, 2008

(87) PCT Pub. No.: WO2007/096803
PCT Pub. Date: Aug. 30, 2007

(65) Prior Publication Data
US 2009/0051300 A1 Feb. 26, 2009

(30) Foreign Application Priority Data
Feb. 20, 2006 (EP) .................................... 06110154

(51) Int. Cl.
*G05F 1/00* (2006.01)
(52) U.S. Cl. ...... 315/307; 315/291; 315/271; 315/209 R

(58) Field of Classification Search .................. 315/194, 315/291, 307
See application file for complete search history.

(56) References Cited

U.S. PATENT DOCUMENTS

| 6,172,469 | B1 | 1/2001 | Kern |
| 6,175,200 | B1 | 1/2001 | Kern |
| 2003/0173910 | A1 | 9/2003 | Suzuki |
| 2005/0093474 | A1 | 5/2005 | Nishita |
| 2005/0162103 | A1 | 7/2005 | Deurloo |
| 2005/0237004 | A1 | 10/2005 | Bonigk |
| 2007/0103088 | A1* | 5/2007 | Tsai et al. ..................... 315/194 |

FOREIGN PATENT DOCUMENTS

| EP | 1473588 A1 | 11/2004 |
| JP | 2004319193 A | 11/2004 |
| WO | 04002200 A1 | 12/2003 |
| WO | 2005006819 A1 | 1/2005 |

\* cited by examiner

Primary Examiner — Shawki S Ismail
Assistant Examiner — Jany Tran

(57) ABSTRACT

Disclosed is a method for driving a gas discharge lamp in at least two operation modes, including the step of applying an alternating voltage to the gas discharge lamp, the alternating voltage having a first polarity during a first time interval and a second polarity opposite to the first polarity during a second time interval. The first time interval and the second time interval are repeated alternately. During a second operation mode, the electrical power being provided to the gas discharge lamp is smaller compared to a first operation mode, and the duration of the first time interval is at least a multiple of the duration of the second time interval.

16 Claims, 5 Drawing Sheets

METHOD AND DRIVING UNIT FOR DRIVING A GAS DISCHARGE LAMP

This invention relates to a method for driving, particularly for dimming, a gas discharge lamp, especially a high pressure gas discharge lamp. Furthermore, the invention relates to a driving unit for driving a gas discharge lamp. Moreover, the invention relates to an image rendering system, particularly a projector system, comprising a gas discharge lamp and such a driving unit.

Gas discharge lamps, for example mercury vapor discharge lamps, comprise an envelope which consists of material capable of withstanding high temperatures, for example, quartz glass. From opposite sides, electrodes made of tungsten protrude into this envelope. The envelope, also called "arc tube" in the following, contains a filling consisting of one or more rare gases, and, in the case of a mercury vapor discharge lamp, mainly of mercury. By applying a high ignition voltage across the electrodes, a plasma arc is generated between the tips of the electrodes.

After the plasma arc has been established, a voltage lower than the ignition voltage can be applied to maintain the plasma arc. In the time period after the ignition, a lamp driving unit typically controls the current such that a certain level of electrical power is provided to the gas discharge lamp. In general, the voltage (or the current) being provided to the gas discharge lamp could either be a direct current type voltage ("DC type") or an alternating current type voltage ("AC type"). If a DC type voltage would be used, one of the electrodes is stressed more than the other electrode and therefore is worn at a much faster rate. Consequently, the usage of DC type voltages would require that for reliability purposes, one of the electrodes has to be much larger than the other electrode. Therefore, it is a common practice to operate gas discharge lamps with an AC type voltage ensuring that both electrodes are stressed evenly. Typical lamp driving units comprise a commutation unit, for example a so-called full bridge circuit, which is used to switch the polarity of the voltage being applied to the gas discharge lamp in order to achieve the preferred evenly wear of the electrodes.

A number of different methods exist to ignite a gas discharge lamp. Using the conventional method, a high voltage surge of more than 20 kV is applied to the electrodes. Some newer methods work with an ignition voltage of less or equal 5 kV and an additional "antenna" which acts to reduce the required voltage.

All these methods have the problem that a user, after inadvertently extinguishing such a lamp, must wait quite a while—up to several minutes—before the lamp can be turned on again. This is because the lamp becomes very hot while turned on, and the pressure in the arc tube rises considerably. The higher the pressure is in the arc tube, the greater is the required ignition voltage. Therefore, the lamp must cool down after being extinguished until the pressure reaches a value at which the lamp can be re-ignited with the usual level of ignition voltage.

In an attempt to address this problem, JP 2004/319193 A describes a method in which the lamp of a projector system is first brought to a lower power level and then driven at this lower power level until the lamp has cooled down to such a point that it could be re-ignited relatively soon after being turned off. During the transition phase in which the lamp is operating at the lower power level, the projector system ensures that the screen is brought to a state in which no image is projected. If, in this transition phase, the lamp is turned on again, the screen can be re-activated and the lamp power can be increased quickly. From the point of view of the user, it is as if the lamp is turned on again immediately. However, the time delay after which the lamp can be re-ignited after being finally turned off depends on the power at which the lamp is driven in the transition phase, since, at a certain power, a certain temperature equilibrium and therefore a certain pressure equilibrium arises in the arc tube. Furthermore, as it is the case for usual lamps, the re-ignition time depends on the level of the ignition voltage. In order to be able to re-ignite the lamp with an ignition voltage as low as possible, it is advantageous to maintain the operation power at a level as low as possible during the transition phase.

However, the lamp operating power can not be reduced unlimitedly while operating the gas discharge lamp with an AC type voltage. Below a certain power level, the plasma arc becomes very unstable and might extinguish while the polarity of the voltage is changing, or soon after the polarity of the voltage has changed. In US 2005/0162103 A1 a solution to this problem is described by switching to a DC type voltage if the current being provided to the gas discharge lamp drops below a certain threshold value. In this low power DC type operation, a better stability of the plasma arc is achieved compared to the AC type operation. Here, the above described uneven wear is not critical since only relatively small currents are applied to the electrodes.

Unfortunately, many driving units cannot supply the gas discharge lamp with a DC type voltage. For example, within a typical driving unit for supplying an AC type voltage, semiconductor devices are used to implement the commutation unit, especially for the above mentioned full bridge circuit. To provide the control inputs of the semiconductor devices with a sufficiently high voltage, a dedicated circuit technique is commonly used. Hereby, a charge is stored on a so-called "bootstrap capacitor" while the full bridge circuit supplies the voltage in one of the two polarities to the gas discharge lamp. If the bridge then switches to the other polarity, the charge stored on the bootstrap capacitor serves as a reservoir for providing a sufficiently high voltage to the control input of at least one of the semiconductor devices within the full bridge circuit. However, due to parasitic effects, like leakage currents within the commutation unit, the charge being stored on the bootstrap capacitors decreases over time. Therefore, such a lamp driving unit cannot be operated in a DC type mode, as the charge being stored on the bootstrap capacitors would become too low at a certain time, thus leading to a malfunction of the commutation unit. Of course, a possible solution could be to provide a second lamp driving unit being capable to apply a DC type voltage to the gas discharge lamp during a low power operating mode. However, that leads to increased implementation costs, because two driving units have to be provided.

Therefore, it is an object of the present invention to provide a method and a driving unit for driving a gas discharge lamp, whereby the lamp can be operated at a reduced power level by supplying an alternating voltage while ensuring the stability of the discharge process.

To this end, the present invention provides a method for driving a gas discharge lamp, whereby an alternating voltage is applied to the gas discharge lamp, the alternating voltage having a first polarity during a first time interval and a second polarity opposite to the first polarity during a second time interval. The method provides two operation modes. In a first operation mode, the first time interval and the second time interval are repeated alternately. In a second operation mode—the "dimming mode"—the electrical power being provided to the gas discharge lamp is smaller compared to the first operation mode. Also, the first time interval and the second time interval are repeated alternately. But, according to the invention, in this second operation mode, the duration of the first time interval is at least a multiple of the duration of the second time interval.

Using this method, the gas discharge lamp can be operated at a relatively low power level without risking that the lamp is extinguished due to instabilities of the gas discharge process. Especially, compared to operating the lamp with an alternating voltage having a first and a second time interval of similar duration, much lower power levels are achievable. Those power levels are comparable to the power levels that are feasible while supplying a DC type voltage. But, instead of providing separate driving units for an AC and a DC type operation, a single AC type lamp driving unit can be used. Furthermore, the invention might enable the application of existing AC type driving units for a reliable low power operation, in many cases even without dedicated hardware modifications.

A corresponding driving unit for driving a gas discharge lamp comprises a commutation unit and a control unit. The commutation unit is applying an alternating voltage to the gas discharge lamp, the alternating voltage having a first polarity during a first time interval and a second polarity opposite to the first polarity during a second time interval. The control unit controls the commutation unit such that during a first operation mode, the first time interval and the second time interval are repeated alternately, and such that during a second operation mode, the electrical power being provided to the gas discharge lamp is smaller compared to the first operation mode, and the first time interval and the second time interval are repeated alternately, whereby the duration of the first time interval is at least a multiple of the duration of the second time interval.

The dependent claims and the subsequent description disclose particularly advantageous embodiments and features of the invention.

When using a typical driving unit as described above, the duration of the second time interval during the second operation mode must be large enough to guarantee that the bootstrap capacitors are sufficiently charged before the polarity of the applied voltage is reversed. However, at the same time, experiments with high pressure gas discharge lamps revealed that during the second time interval, after some cool down time, little or no current is flowing between the electrodes of the gas discharge lamp. This can be explained by the fact that one of the electrodes of the lamp cools down more than the other during the second operation mode. Therefore, the gas discharge lamp will not conduct much current during the second time interval, when the colder of the electrodes is operated as an anode, since this electrode is not able to emit a larger number of electrons due to its relatively low temperature. If the duration of the second time interval exceeds a certain value, the formation of the plasma arc becomes instable. In other words, there might be an increased probability that the gas discharge lamp is extinguished during the second operation mode, if the second time interval is too long in relation to the first time interval. Therefore, there will be preferred range for the ratio between the duration of the first time interval and the duration of the second time interval during the second operation mode, which is best suited for operating a gas discharge lamp according to the invention. This range depends to a certain extent on the properties of the gas discharge lamp, like the dimensions of the electrodes, the nominal electrical power rating of the lamp, or the composition of the rare gases being used inside the arc tube. In a preferred embodiment of the invention, the duration of the first time interval is at least approximately 40 times, preferably at least approximately 100 times, most preferably at least approximately 200 times larger than the duration of the second time interval while operating the lamp in the second operation mode.

In another preferred embodiment of the invention, during the first operation mode, the duration of the first time interval is of the same magnitude as the duration of the second time interval. Often, gas discharge lamp are designed based on the assumption that the duration of the first time interval and the duration of the second time interval have similar values while the lamp is operated close to or at its nominal electrical power level. Hereby, an uneven wear of the electrodes is avoided.

Furthermore, gas discharge lamps are typically supplied with an alternating voltage having a frequency of 40 Hz to 10 kHz, while operating the lamp close to or at its nominal electrical power rating. This frequency range would then be applied during the first operation mode. In one preferred embodiment of this invention, the frequency of the voltage being applied to the gas discharge lamp is similar or even identical to the frequency, which is being used during the first operation, hence similar or identical to the frequency which is applied when the gas discharge lamp is operated close to or at its nominal electrical power rating. In another preferred embodiment of the invention, the frequency of the alternating voltage during the second operation mode is much smaller than the frequency of the alternating voltage during the first operation mode. Thereby, the stability of the plasma arc could be improved while operating the lamp in the second operation mode of the invention, especially if very low levels of electrical power are provided to the lamp. Favourably, the frequency of the alternating voltage during the second operation mode is equal to the normal operation frequency, alternatively equal or less than 100 Hz, preferably between 0.1 Hz and 90 Hz, most preferably between 0.5 Hz and 60 Hz.

In another preferred embodiment of the invention, the duration of the second time interval during the second operation mode is smaller than 10 ms, preferably smaller than 1 ms, most preferably smaller than 0.1 ms. By limiting the duration of this second time interval, it can be prevented that the plasma arc becomes instable while operating the lamp in the second operation mode. Again, the preferred range of the duration of the second time interval depends on the specific properties of a gas discharge lamp and on the power level that is targeted during the second operation mode. In general a shorter time will perform better, which is then only limited by the capabilities of the lamp driving unit.

According to the invention, the electrical power being supplied to the gas discharge lamp in the second operation mode is smaller compared to the first operation mode. The reduction of the electrical power when switching from the first to the second operation mode can be performed in several ways. One preferred method requires that the electrical power being provided to the gas discharge lamp is reduced directly before or during the transition from the first operation mode to the second operation mode. In typical driving units, the electrical power being supplied to the gas discharge lamp is adjusted by regulating the current that is provided to the gas discharge lamp. Consequently, according to the described method, the reduction of the power when switching from the first to the second operation mode will be achieved by reducing the current supplied to the lamp, either directly before or during the transition from the first to the second operation mode.

In an especially preferred method according to the invention, the reduction is performed in a number of steps. This method could improve the stability of the discharge or plasma arc when switching from the first to the second operation mode. Hereby, it can also be ensured that the transition to the different time intervals of the second operation mode is applied only after the electrical power being provided to the gas discharge lamp is sufficiently low to protect the electrodes from damaging.

The invention provides a method that allows operating a gas discharge lamp reliably at power levels which are much lower than the nominal electrical power rating of the gas discharge lamp. In experiments performed on high pressure gas discharge lamps, it was confirmed that for example a lamp with a nominal electrical power rating of 132 W could be dimmed reliably down to a power level as low 20 W while operating the lamp in the second operation mode according to the invention. In a preferred embodiment of the invention, the electrical power being provided to the gas discharge lamp during the second operation mode is at least approximately 2 times, preferably at least approximately 4 times, most preferably at least approximately 6 times smaller than the nominal electrical power rating of the gas discharge lamp.

When a gas discharge lamp is operated according to the second operation mode, the electrical power being provided to the gas discharge lamp could be increased again without any wait time since the discharge arc inside the arc tube is maintained during the second operation mode. For example, the gas discharge lamp can be switched back from a dimmed operation in the second operation mode to a non-dimmed operation at the nominal electrical power rating by returning to the first operation mode. This is preferably done in two steps to achieve an optimal stability of the plasma arc. Thereby, it can be avoided, that the plasma arc extinguishes or that the electrodes are damaged. In a first step, the electrical power being provided to the gas discharge lamp is increased in one or more small steps to an intermediate level. Then, in a second step, the gas discharge lamp is switched from the second to the first operation mode and the electrical power is increased from the intermediate level to its nominal electrical power rating. In addition, it is desirable that the gas discharge lamp could be turned on again shortly after it has been turned off completely. In a particularly preferred embodiment of the invention, the electrical power being provided to the gas discharge lamp during the second operation mode is reduced to a level leading to a temperature and/or a pressure inside the arc tube of the gas discharge lamp which allows to turn off the gas discharge lamp completely, while maintaining the ability to re-ignite the gas discharge lamp essentially immediately. Various possibilities exist for determining an appropriate power level for the second operation mode in this case. In a simple version, this level could be a fixed value that was obtained for example from experiments. Alternatively, the temperature of the gas discharge lamp might be monitored, thereby providing an indication about the state of the temperature and/or pressure inside the arc tube. An indication of the state of the pressure might also be obtained by monitoring the voltage/current characteristic of the lamp. Similarly, the time that is required to achieve a sufficient reduction of temperature and/or pressure before the gas discharge lamp can be turned off could be a fixed value, for example 180 sec., that has been obtained from experiments. Alternatively, for example, the voltage and/or current being provided to the gas discharge lamp could be monitored. If no significant change in the voltage and/or current could be observed anymore, it may be assumed that the lamp has reached the equilibrium level for temperature and/or pressure at this power setting.

An image rendering system according to the invention, in particular a projection system, must, according to the invention, comprise, besides a gas discharge lamp, a driving unit pursuant to the invention.

Particularly preferably, such an image rendering system should also comprise a user interface unit for providing user requests to the control unit within the driving unit. Furthermore, the control unit should comprise an input for receiving a user request. Upon reception of a user request, the control unit switches the operation mode of the gas discharge lamp from the first operation mode to the second operation mode and/or from the second operation mode to the first operation mode. Accordingly, if a user wants to turn off the image rendering system, he would for example push a button on the user interface. Subsequently, the image rendering system would convey this "shut down" request to the control unit. Instead of turning off the gas discharge lamp immediately, the control unit would switch from the first to the second operation mode. Only after the temperature and/or pressure inside the arc tube have reached a sufficiently low level, the gas discharge lamp would be turned off completely thereby ensuring a short re-ignition time. Similarly, if the gas discharge lamp is already operated in the second operation mode, a "power on" request by the user would be conveyed from the image rendering system to the control unit. Subsequently, the control unit would switch from the second to the first operation mode.

Use of such a higher-ranking control unit has the advantage that a typical driving unit needs only be slightly modified, for example by corresponding software updates in a programmable control chip of the driving unit which controls the electrical power being provided to the gas discharge lamp. Complicated hardware modifications to the driving unit would not be necessary.

Most projection systems have, in any case, a central control unit which controls and synchronizes further components of the projection system, such as, for example, a colour wheel or a display. In such a case, the central control unit can be used to issue an appropriate command for the display, simultaneously with the "shut down" request for the driving unit, in order to cause the display to be darkened, i.e. further image rendering is avoided as long as the gas discharge lamp is operated in the second operation mode ahead of turning off the lamp completely. This process effectively goes unnoticed by the user. He will only be aware of the fact that the projection system can be turned on again immediately after an inadvertent turning off, since the gas discharge lamp is either still in the second operation mode and can therefore be brought back to a normal operating power level, or if the gas discharge lamp has indeed been extinguished completely, it will have cooled down sufficiently during the second operation mode, so that it can be re-ignited essentially immediately.

In a further preferred embodiment of the invention, the image rendering system is built up such that it is capable of obtaining a brightness criterion of an image. Additionally, the control unit of the driving unit comprises an input for receiving the brightness criterion. Depending on the brightness criterion, the control unit adjusts the electrical power being provided to the gas discharge lamp. Since this invention allows operating a gas discharge lamp at very low levels of electrical power by applying the second operation mode, a significantly increased dimming level becomes feasible. In other words, depending on the brightness criterion, the gas discharge lamp might be switched from the first operation mode to the second operation mode or from the second operation mode to the first operation mode. Thereby, the gradual dimming of gas discharge lamps—whereby the lamp power level is determined by the video content—can be realized in a very wide dimming range. Generally, as it is known to the technical experts in this field, it would be possible to dim the picture for darker scenes by appropriate control of the picture-rendering component of a projector system, e.g. the display. However, for a display with a particular number of brightness levels (e.g. 8 bits), this technique would result at least partly in a loss of the dynamic range, since some of the bits cannot be used. Dimming the projector system by means of the picture-rendering components thus leads to a loss in contrast. By dimming the light source according to the invention, on the other hand, the entire contrast range offered by the picture-rendering components can be put to use, even in dark scenes, whereby, also at very low power levels, a stable light output is ensured. Preferably, the frequency of the alternating voltage being provided to the gas discharge lamp during the first and/or the second operation mode is synchronized with the frequency of the images being rendered by the projection system.

The invention can be applied to various kinds of gas discharge lamps. In particular, the invention is suited for high pressure gas discharge lamps, especially for UHP (Ultra High Performance) and/or for HID (High Intensity Discharge) lamps. As has been described above, the invention offers significant advantages if it is used for gas discharge lamps within image rendering systems. Nevertheless, the invention is not limited to these applications. For example, the invention could also be applied advantageously for gas discharge lamps which are used in motor vehicles, like gas discharge lamps for head lights.

Other objects and features of the present invention will become apparent from the following detailed descriptions considered in conjunction with the accompanying drawings. It is to be understood, however, that the drawings are designed solely for the purposes of illustration and not as a definition of the limits of the invention.

The dimensions of the objects in the figures have been chosen for the sake of clarity and do not necessarily reflect the actual relative dimensions.

Figure 1:
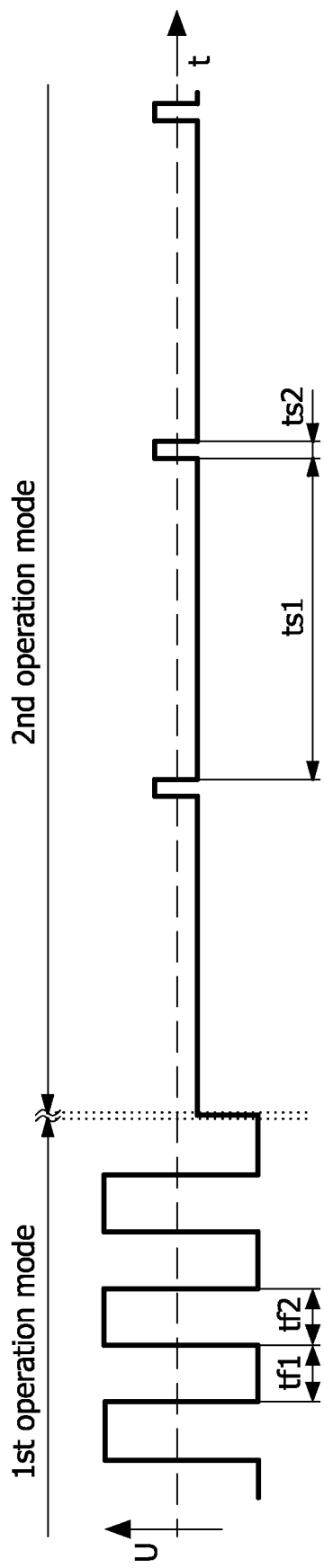
FIG. 1 shows a schematic waveform of the alternating voltage being applied to the gas discharge lamp during the first and the second operation mode according to the invention.

FIG. 1 shows a schematic waveform of the alternating voltage U being applied to the gas discharge lamp 1 during the first and the second operation mode according to the invention. In the first operation mode, two different time intervals tf1 and tf2 are depicted, whereby the polarity of the voltage U during the first time interval tf1 is different from the polarity of the voltage U during the second time interval tf2. If gas discharge lamps 1 with electrodes 2 of similar size or geometry are used, the duration of tf1 and tf2 as well as the respective amplitudes of voltage U might be chosen such that a similar amount of energy is supplied to the gas discharge lamp 1 for each of the time intervals tf1 and tf2 to ensure an even wear of the electrodes 2.

During the second operation mode, the duration of the first time interval ts1 is at least a multiple of the duration of the second time interval ts2. Also, the electrical power P being supplied to the gas discharge lamp 1 will be reduced compared to the first operation mode. However, it has to be mentioned that due to the special characteristics of gas discharge lamps 1, the reduction in electrical power P does not immediately lead to a reduction in voltage U. This is caused by the negative current-voltage characteristics of gas discharge lamps 1, meaning that a reduction of the lamp power P, usually effected by reducing the current I, causes an increase in operation voltage U. Only after some time, when the reduction of electrical power P has lead to a reduction of temperature and/or pressure within the arc tube 3, the amplitude of voltage U during time interval ts1 might become lower compared to the amplitudes during time intervals tf1 and/or tf2.

Furthermore, as the gas discharge lamp 1 typically will show a relatively low conductivity during the shorter reverse period ts2, the amplitude of voltage U might even be larger during time interval ts2, compared to the time intervals tf1 and/or tf2. In certain cases, it might even be advisable to limit the voltage U during time interval ts2 in order to avoid oscillations, especially while switching from time interval ts2 to time interval ts1.

In addition, the shown square-shaped waveform of voltage U is an ideal representation. In practice, deviations from the square-like shape might occur—or even are intentionally applied—especially during or close to the reversal of the polarity.

Therefore, FIG. 1 is solely used to illustrate the alternating polarity of voltage U and the relative duration of the first time interval ts1 compared to the second time interval ts2 during the second operation mode. Furthermore, it is obvious that, contrary to FIG. 1, the voltage U could exhibit a positive value during time intervals tf1 and/or ts1 and a negative value during time intervals tf2 and/or ts2 without leaving the scope of the invention.

Figure 2:
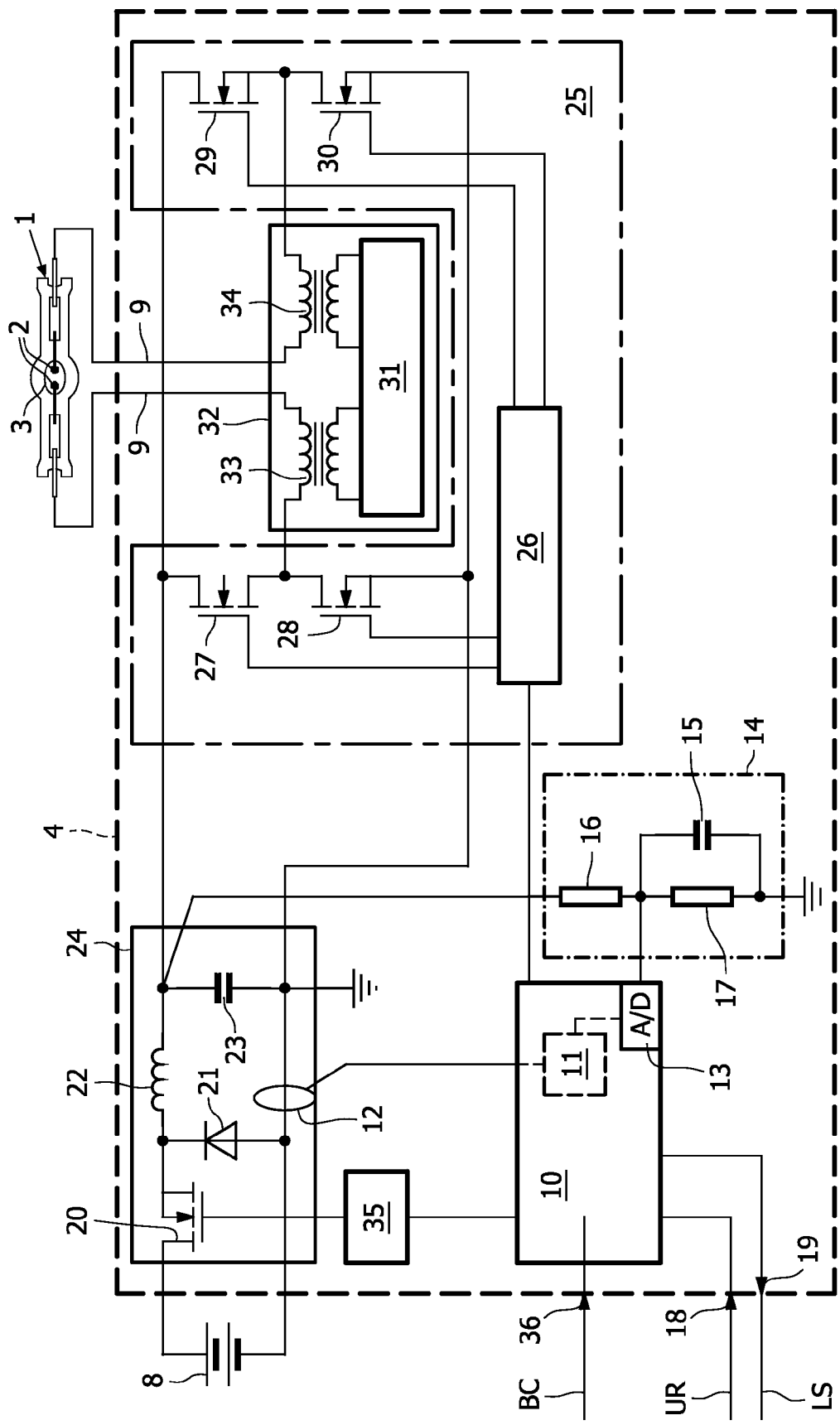
FIG. 2 shows a gas discharge lamp and a block diagram of a possible realisation of a driving unit according to the invention.

FIG. 2 shows a gas discharge lamp 1 and a block diagram of a possible realisation of a driving unit 4 according to the invention.

The driving unit 4 is connected via connectors 9 with the electrodes 2 inside the arc tube 3 of the gas discharge lamp 1. Furthermore, the driving unit 4 is connected to a power supply 8, and features a signal input 18 to receive a user request UR, for example a "shut down" request, or other control signals. Moreover, the driving unit 4 comprises a signal input 36 to receive a brightness criterion BC of an image, and also an signal output 19, for reporting, for example, the lamp status LS to a higher-level control unit.

The driving unit 4 comprises a buck converter 24, a commutation unit 25, an ignition arrangement 32, a level converter 35, a control unit 10, a voltage measuring unit 14, and a current measuring unit 12.

The control unit 10 controls the buck converter 24, the commutation unit 25, and the ignition arrangement 32, and might also monitor the behaviour of the voltage at the gas discharge lamp 1.

The commutation unit 25 comprises a driver 26 which controls four switches 27, 28, 29, and 30. The ignition arrangement 32 comprises an ignition controller 31 (comprising, for example, a capacitor, a resistor and a spark gap) and an ignition transformer which generates, with the aid of two chokes 33, 34, a high voltage so that the gas discharge lamp 1 can ignite.

The buck converter 24 is fed by the external DC type power supply 8 of, for example, 380V. The buck converter 24 comprises a switch 20, a diode 21, an inductance 22 and a capacitor 23. The control unit 10 controls the switch 20 via a level converter 35, and thus also the current I in the gas discharge lamp 1. In this way, the electrical power P being provided to the gas discharge lamp 1 is regulated by the control unit 10.

The voltage measuring unit 14 is connected in parallel to the capacitor 23, and is realized in the form of a voltage divider with two resistors 16, 17. A capacitor 15 is connected in parallel to the resistor 17.

For voltage measurements, a reduced voltage is established by the voltage divider 16, 17, and measured in the control unit 10 by means of an analogue/digital converter 13. The capacitor 15 serves to reduce high-frequency distortion in the measurement signal.

The current I in the gas discharge lamp 1 is monitored in the control unit 10 by means of the current measuring unit 12, which might for example operate on the principle of induction.

Based on the monitored current and the monitored voltage, the control unit 10 can calculate the electrical power P currently being provided to the gas discharge lamp 1 and adjust it via level converter 35 and switch 20, if the power level does not meet a certain target value.

Furthermore, the control unit 10 is implemented so that it is capable of supporting the first and the second operation mode according to the invention. During normal operation, the control unit 10 would control the commutation unit 25 such that the commutation unit 25 applies an alternating voltage U according to the first operation mode of the invention to the gas discharge lamp 1. Then, if the control unit 10 receives a user request UR indicating a "shut down" request on signal input 18, it will adjust the control of the commutation unit 25 such that the alternating voltage U being applied to the gas discharge lamp 1 follows the characteristics of the second operation mode of this invention. That means that the control unit 10 is capable of setting different timings for an alternating voltage U by providing an appropriate control signal to the commutation unit 25.

In addition, the control unit 10 will reduce the electrical power P being provided to the gas discharge lamp 1 when switching from the first to the second operation mode. The lamp current I is controlled by buck converter 24. The current I is adjusted by the timing of the switching of switch 20, which is controlled from control unit 10 via the level converter 35. A reduction of the lamp current I is achieved by reducing the on-time of switch 20.

Additionally, after operating in the second operation mode for some time, the control unit 10 might switch off the gas discharge lamp 1 completely. Preferably, the gas discharge lamp 1 is only switched off after the temperature and/or pressure inside the arc tube 3 are sufficiently low, so that the gas discharge lamp 1 can be re-ignited essentially immediately. To guarantee that this "wait time" at the reduced power level within the second operation mode has been long enough, the control unit 10 might monitor the progression of the voltage obtained via voltage measuring unit 14. If this voltage is relatively stable, i.e. the rate at which the voltage is changing is below a certain threshold value, the control unit 10 can switch off the gas discharge lamp 1 completely. In a similar fashion, the control unit 10 might also monitor the current via current measuring unit 12 and switch off the gas discharge lamp 1 once the current becomes relatively stable. In an alternative embodiment, the control unit 10 might simply switch off the gas discharge lamp 1 after it was operated at certain power level for a predefined amount of time. This predefined amount of time could have been obtained from experiments. Furthermore, the control unit 10 might comprise a programmable microprocessor. In this case, the first and the second operation mode according to the invention would be implemented in the form of software running on the microprocessor of the control unit 10.

The momentary lamp status LS of the gas discharge lamp 1 can be made known by the control unit 10 via the signal output 19. In particular, the lamp status LS can report whether the gas discharge lamp 1 is still being operated in the second operation mode, or whether the gas discharge lamp has been switched off completely.

If the driving unit 4 is used within an image rendering system to adjust the electrical power P depending on the brightness of an image, the driving unit 4 might also comprise a signal input 36, at which the image rendering system provides a brightness criterion BC, i.e. information on the brightness of the image, to control unit 10. An analyzing unit 11 might then obtain the current level of electrical power P being provided to the gas discharge lamp 1 and adjust it according the brightness criterion BC provided on signal input 36. In particular, control unit 10 might switch from the first to the second operation mode, if an image with relatively low brightness should be displayed. Also, control unit 10 might adjust the level of electrical power P according to the brightness criterion BC received at signal input 36, while staying within the second operation mode. Obviously, it depends on the characteristics of the image rendering system as well as on the characteristics of the particular gas discharge lamp 1, when the control unit 10 is switching from the first to the second operation mode. For example, for a relatively low degree of dimming, a certain gas discharge lamp 1 could be operated reliably in the first operation mode. Only if the power level required for a reduced image brightness would be so low, that for a certain gas discharge lamp 1 the plasma arc might become instable, the control unit 10 would switch from the first to the second operation mode according to the invention. Also, the exact parameters in the second operation mode, e.g. the frequency, the exact length of the first time interval and the second time interval, may depend on the current power.

Figure 3:
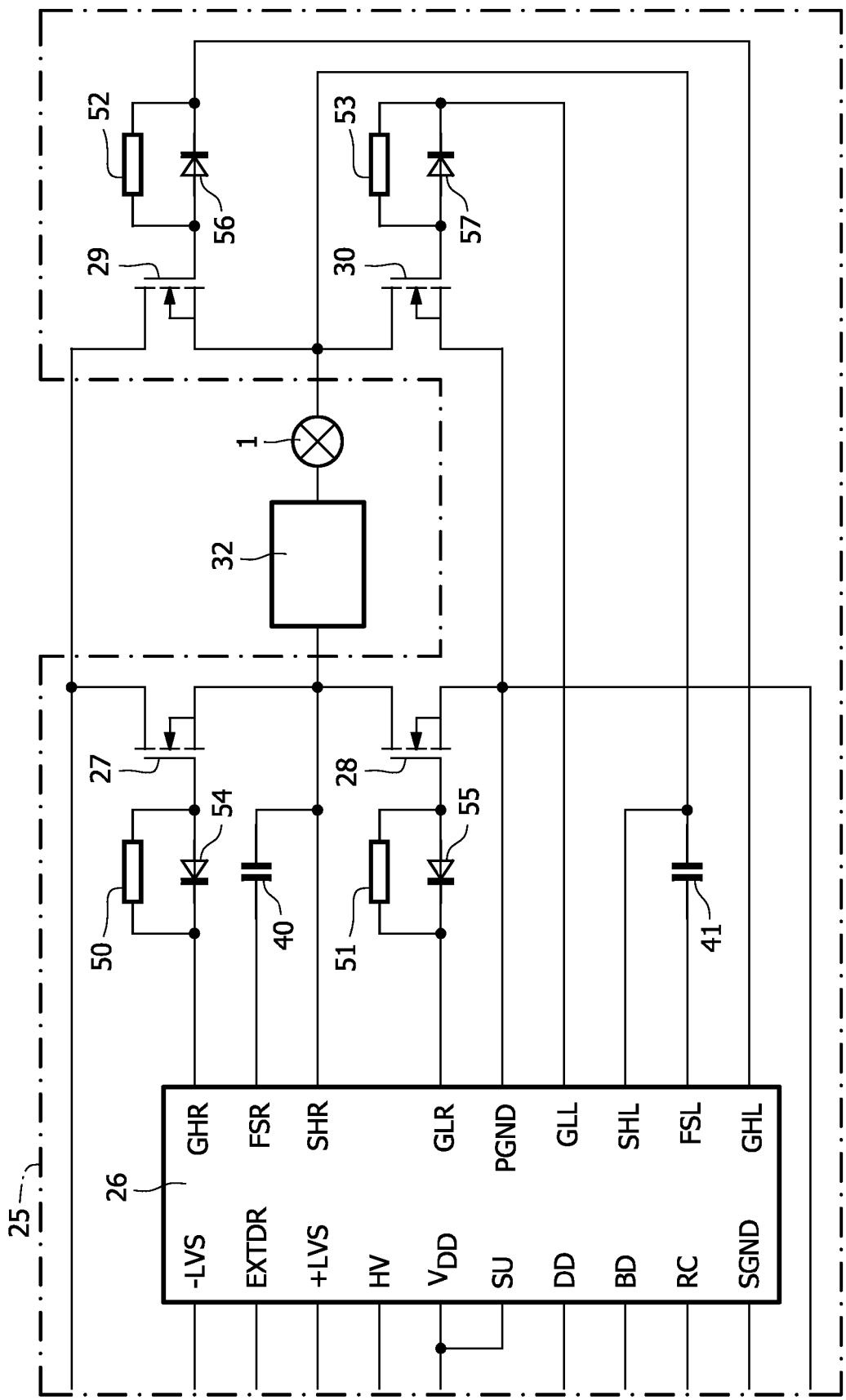
FIG. 3 shows a schematic block diagram comprising a commutation unit, an ignition arrangement, and a gas discharge lamp.

FIG. 3 shows a schematic block diagram comprising a specific realization of a commutation unit 25, an ignition arrangement 32, and a gas discharge lamp 1. For the sake of clarity, the ignition arrangement 32 and the gas discharge lamp 1 are depicted in a simplified manner. The driver 26 is depicted with typical input and output signals, as they would be available for example on the "UBA2033 HF full bridge driver IC", which is provided by Philips Semiconductors.

The commutation unit 25 comprises the switches 27, 28, 29, and 30 like in FIG. 2. The high-side switches 27 and 29 are connected to the higher potential of the voltage provided by buck converter 24, whereas the low-side switches 28 and 30 are connected to the lower potential of the voltage provided by buck converter 24. In addition, bootstrap capacitors 40 and 41, resistors 50, 51, 52, and 53, as well as diodes 54, 55, 56, and 57 are shown.

The bootstrap capacitors 40 and 41 are essential for supplying the control inputs of the high-side switches 27 and 29 with a high enough voltage which ensures a sufficient conductivity while the switches are turned on. To achieve this, the FSR side of the bootstrap capacitor 40 will be charged with a positive voltage, for example the supply voltage of driver 26, while switches 28 and 29 are turned on and switches 27 and 30 are turned off. If the polarity of the voltage on the gas discharge lamp 1 is then changed by the commutation unit 25 by turning off switches 28 and 29 and turning on switches 27 and 30, the charge stored on bootstrap capacitor 40 serves as a reservoir for driver 26, so that driver 26 can provide a sufficiently high voltage on signal GHR. Accordingly, bootstrap capacitor 41 is charged with a positive voltage via signal FSL while switches 28 and 29 are turned off and switches 27 and 30 are turned on. After a polarity reversal, bootstrap capacitor 41 serves as a charge reservoir for providing switch 29 with a sufficiently high voltage via signal GHL. Accordingly, the present invention ensures that a commutation unit 25 according to FIG. 3 can be operated without any changes at different power levels, since the polarity of the voltage at the gas discharge lamp 1 is reversed regularly in the first as well as in the second operation mode. Hereby, it can be ensured that the charge on the bootstrap capacitors 40, 41 is restored in a regular fashion. Otherwise, due to parasitic effects like leakage currents, the charge would be reduced down to a level which would lead to a malfunction of the commutation unit 25.

The resistors 50, 51, 52, and 53 and diodes 54, 55, 56, and 57 in FIG. 3 are shown for completeness only. Resistors 50, 51, 52, and 53 are mainly used to protect the driver 26 from voltage overstress when the gas discharge lamp 1 is being ignited. Diodes 54, 55, 56, and 57 are mainly applied to ensure a fast turn off of the transistors 27, 28, 29, and 30 so that together with the duration of the so-called "dead time" there is never a phase when transistor pairs 27 and 28 and/or transistor pairs 29 and 30 conduct at the same time.

Figure 4:
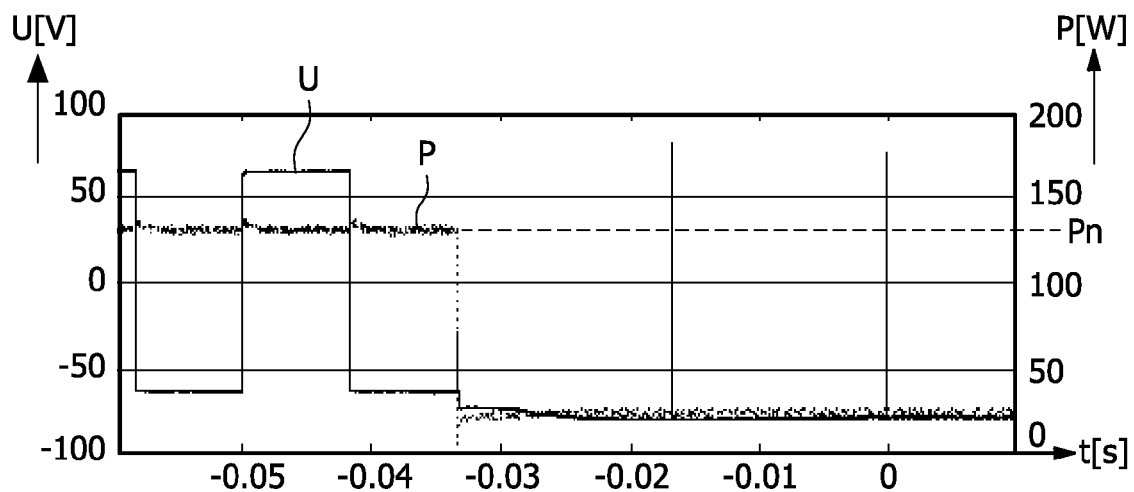
FIG. 4 shows the progression of the momentary voltage, electrical power, and current at the gas discharge lamp, including a transition from the first to the second operation mode according to the invention.
Figure 4:
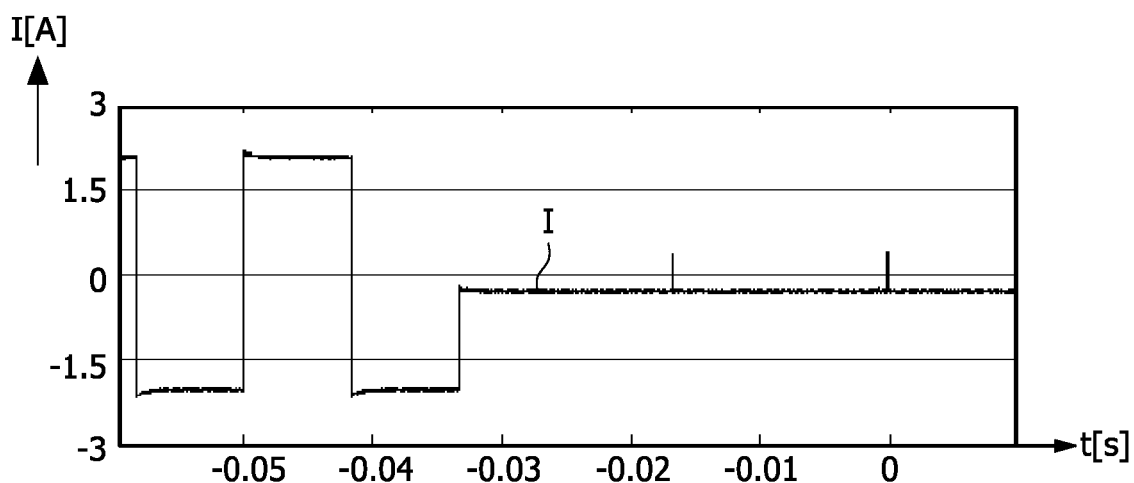

In the upper half of FIG. 4, the progression of the momentary voltage U, and the momentary electrical power P are shown. The lower half of FIG. 4 depicts the momentary current I. All three progressions have been measured at a gas discharge lamp 1 with a nominal power rating Pn of 132 W which is being operated according to the invention. Generally, a gas discharge lamp 1 could be switched at any time from the first to the second operation mode without leaving the scope of the invention. In this particular experiment, the gas discharge lamp 1 is switched from the first to the second operation mode at time=−0.033 s. Also, in this basic experiment, the operating frequency is around 60 Hz in both operating modes. During the first operation mode, the duration of both time intervals tf1 and tf2 is of similar size, whereas during the second operation mode, an extreme duty cycle of around 0.25% is applied. In other words, the duration of time interval ts1 is approximately 400 times larger compared to the duration of time interval ts2. Also, the electrical power P being provided to the gas discharge lamp 1 is reduced from around 132 W down to 20 W while switching from the first to the second operation mode. Despite this relatively low power level, the gas discharge lamp 1 does not extinguish. Furthermore, the relatively short reverse time interval ts2 is sufficient to restore the charge on at least one of the bootstrap capacitors 40, 41. As described earlier, the measurements also show that shortly after switching to the second operation mode, the amplitudes of voltage U are higher during the second operation mode in comparison with the first operation mode.

However, after some time, when the temperature and/or pressure inside the arc tube 3 of the gas discharge lamp 1 did decrease due to the lowered power level, the amplitude of voltage U will become smaller. At the same time, the driving unit 4 will increase the current I to keep a pre-defined power level, in this case 20 W.

Figure 5:
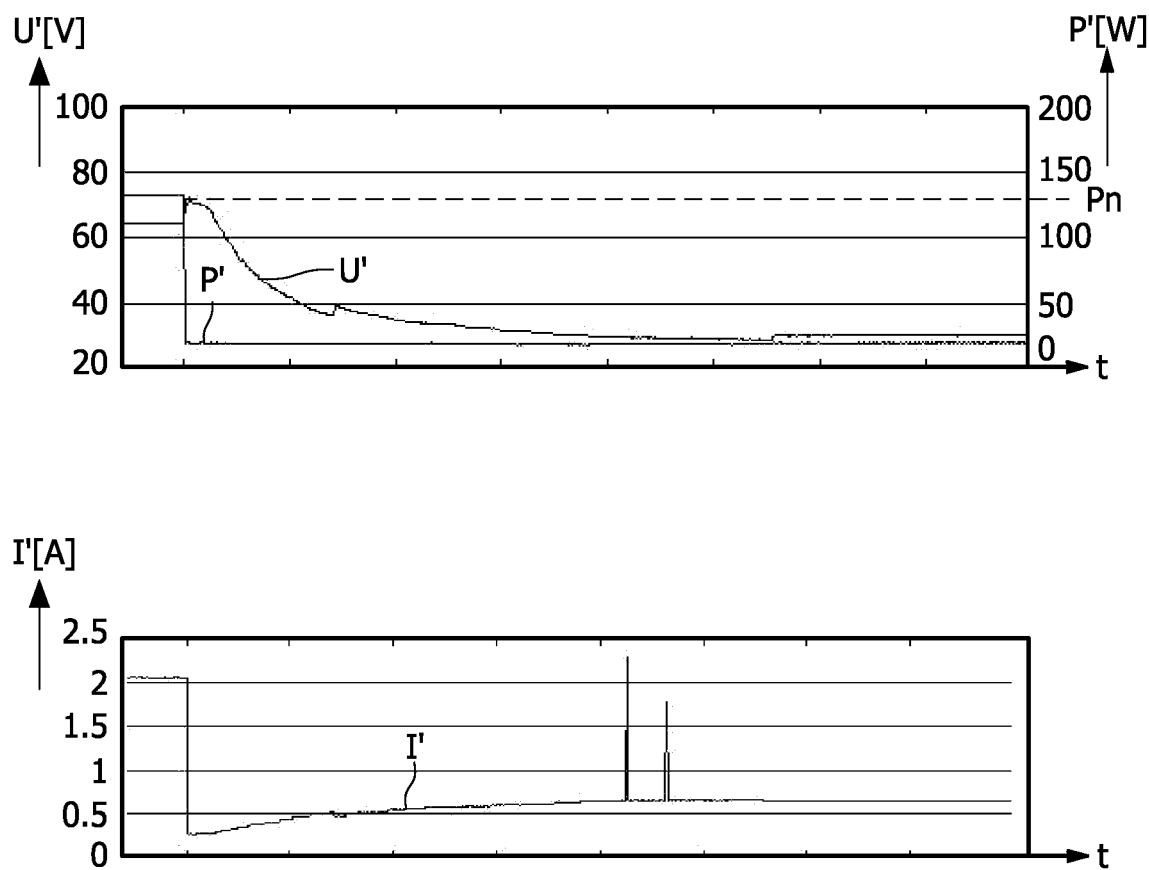
FIG. 5 shows the progression of the RMS (root mean square) values of the voltage, the RMS values of the current, as well as the electrical power at the gas discharge lamp for approximately five minutes, including a transition from the first to the second operation mode according to the invention.

This can be seen in FIG. 5. The upper half of FIG. 5 shows the progression of the RMS (root mean square) value U' of voltage U, whereas the lower half of FIG. 5 depicts the RMS value I' of current I. Furthermore, the electrical power P' being the product of U' and I' is shown in the upper half of FIG. 5. The marks on the x-axis are arbitrary units. The overall range of FIG. 5 covers approximately five minutes of measurement time, whereby the transition from the first to the second operation mode occurs close to the first mark on the x-axis, counting from the left hand side. After the second operation mode has been applied for a few minutes, current I' and voltage U' have reached a relatively stable state (the spikes in the waveform of current I' are measurement artefacts). This stable state can be used as an indication to a control unit 10 that the gas discharge lamp 1 has cooled down sufficiently, so that it can be shut off completely while maintaining the ability to reignite it relatively quickly. Also, the stable behaviour confirms that the invention allows operating a gas discharge lamp 1 reliably at levels of electrical power P which are much below the nominal electrical power rating Pn while using a common AC type driving unit 4.

Although the present invention has been disclosed in the form of preferred embodiments and variations thereon, it will be understood that numerous additional modifications and variations could be made thereto without departing from the scope of the invention. For the sake of clarity, it is also to be understood that the use of "a" or "an" throughout this application does not exclude a plurality, and "comprising" does not exclude other steps or elements. Also, a "unit" may comprise a number of blocks or devices, unless explicitly described as a single entity.

The invention claimed is:

1. A method for driving a gas discharge lamp in at least a first and a second operation modes, the method comprising applying an alternating voltage to the gas discharge lamp, the alternating voltage having a first polarity during a first time interval and a second polarity opposite to the first polarity during a second time interval, the first time interval and the second time interval being repeated alternately, wherein in the second operation mode, the electrical power being provided to the gas discharge lamp is smaller compared to the first operation mode, and the duration of the first time interval is at least a multiple of the duration of the second time interval, and wherein, in the second operation mode, the electrical power being provided to the gas discharge lamp is reduced to a level leading to temperature and/or pressure levels inside an arc tube of the gas discharge lamp that enable to turn off the gas discharge lamp completely, while maintaining the ability to re-ignite the gas discharge lamp essentially immediately.

2. The method according to claim 1, wherein during the second operation mode, the duration of the first time interval is at least approximately 40 times larger than the duration of the second time interval (ts2).

3. The method according to claim 1, wherein, during the second operation mode, the electrical power (P) being provided to the gas discharge lamp is at least approximately 2 times smaller than the nominal electrical power rating (Pn) of the gas discharge lamp.

4. The method according to claim 1, wherein, during the second operation mode, the frequency of the alternating voltage is smaller than the frequency of the alternating voltage during the first operation mode.

5. The method according to claim 4, wherein, during the second operation mode, the frequency of the alternating voltage is equal or less than 100 Hz.

6. The method according to claim 4, wherein, during the second operation mode, the frequency of the alternating voltage is between 0.1 Hz and 90 Hz.

7. The method according to claim 4, wherein, during the second operation mode, the frequency of the alternating voltage is between 0.5 Hz and 60 Hz.

8. The method according to claim 1, wherein, during the second operation mode, the duration of the second time interval is smaller than 10 ms.

9. The method according to claim 1, wherein the electrical power (P) being provided to the gas discharge lamp is reduced directly before or during the transition from the first operation mode to the second operation mode.

10. The method according to claim 1, wherein the electrical power (P) being provided to the gas discharge lamp is reduced in a number of steps.

11. The method according to claim 1, wherein during the second operation mode, the duration of the first time interval is at least approximately 200 times larger than the duration of the second time interval.

12. The method according to claim 1, wherein, during the second operation mode, the electrical power (P) being provided to the gas discharge lamp is at least approximately 4 times smaller than the nominal electrical power rating (Pn) of the gas discharge lamp.

13. The method according to claim 1, wherein, during the second operation mode, the electrical power (P) being provided to the gas discharge lamp is at least approximately 6 times smaller than the nominal electrical power rating (Pn) of the gas discharge lamp.

14. The method according to claim 1, wherein, during the second operation mode, the frequency of the alternating voltage is substantially equal to the normal operation frequency of the gas discharge lamp.

15. The method according to claim 1, wherein, during the second operation mode, the duration of the second time interval is smaller than 1 ms.

16. The method according to claim 1, wherein, during the second operation mode, the duration of the second time interval is smaller than 0.1 ms.

* * * * *